Sept. 27, 1955      H. E. WICKS      2,719,016

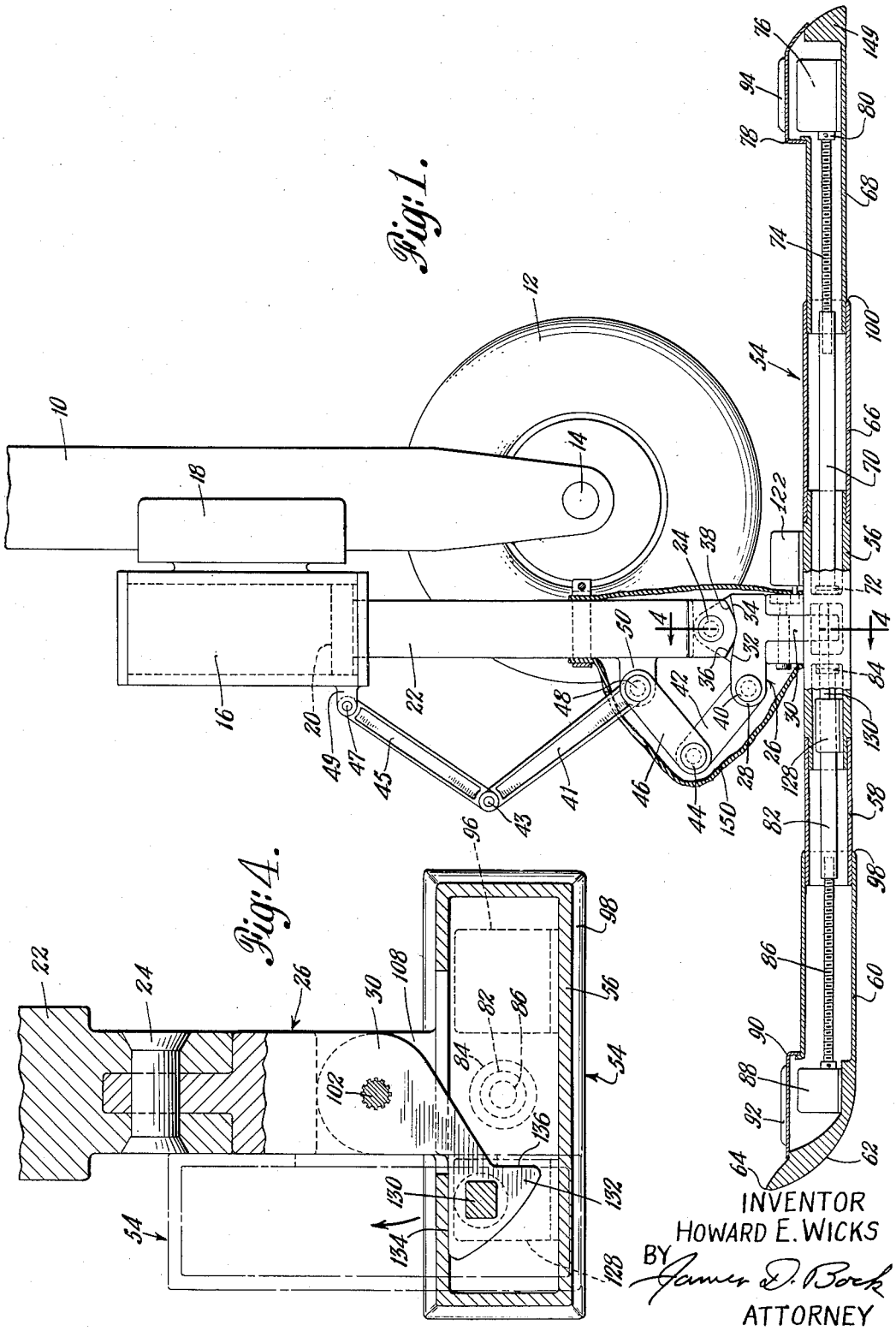

AIRCRAFT LANDING GEAR

Filed April 13, 1951      3 Sheets-Sheet 2

INVENTOR
HOWARD E. WICKS
BY
*James D. Bock*
ATTORNEY

Sept. 27, 1955 H. E. WICKS 2,719,016
AIRCRAFT LANDING GEAR
Filed April 13, 1951 3 Sheets-Sheet 3
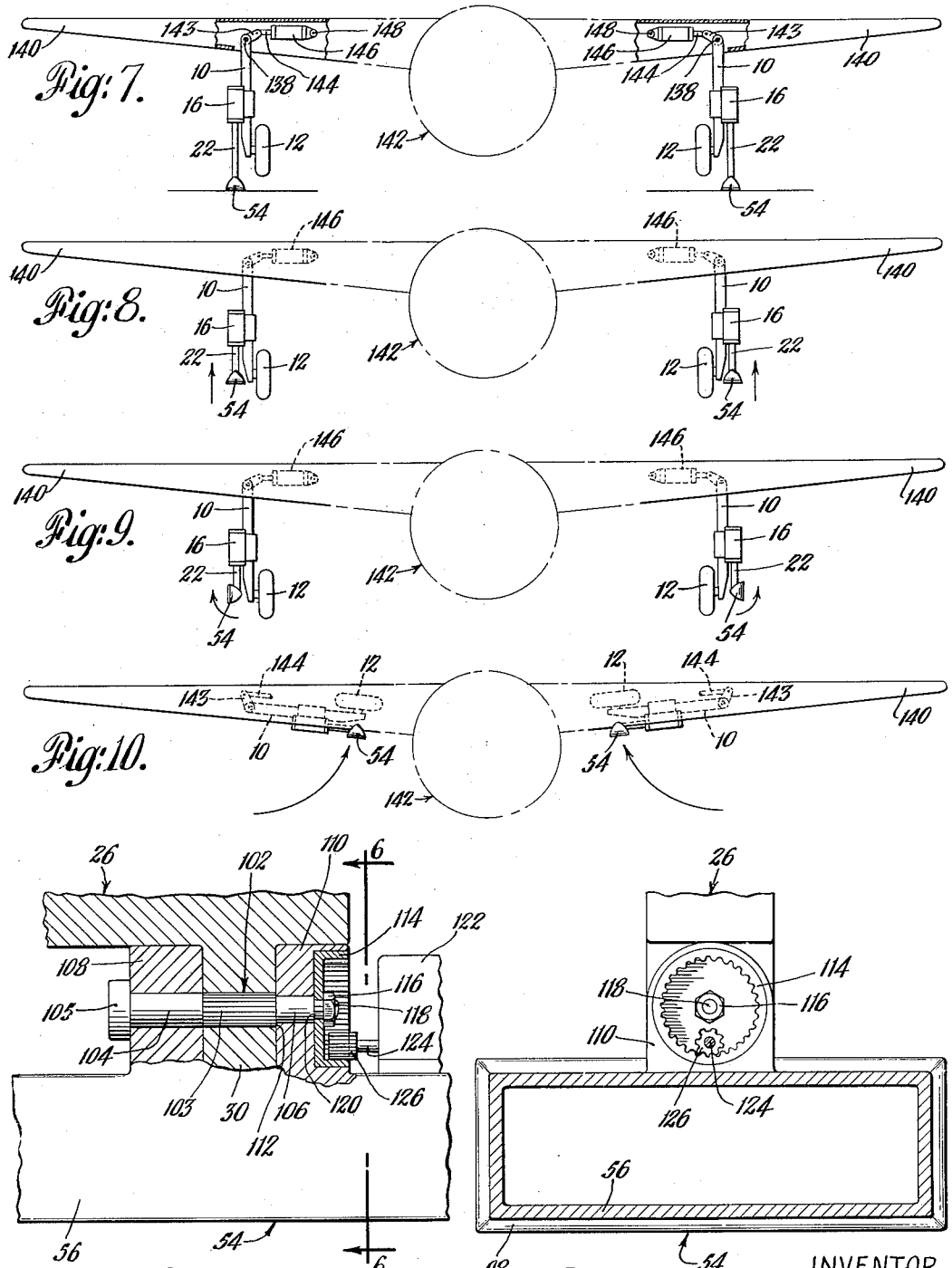
INVENTOR
HOWARD E. WICKS
BY
James D. Bock
ATTORNEY

United States Patent Office 2,719,016
Patented Sept. 27, 1955

2,719,016

AIRCRAFT LANDING GEAR

Howard E. Wicks, Bay Shore, N. Y.

Application April 13, 1951, Serial No. 220,785

8 Claims. (Cl. 244—102)

The present invention relates to landing gear for aircraft and in particular, it provides a landing gear equipped with wheels and with skis which are so arranged that either the wheels or the skis may be used entirely at the option of the operator of the aircraft. In a preferred embodiment of the invention, both the wheels and the skis are mounted for retraction into a position in which they offer a minimum of wind resistance. If so desired, the wheels and skis may be mounted on a common retractable landing gear suitable for the particular aircraft upon which they are mounted. Either the wheels or the skis may be movable relative to the other upon the landing gear so that either may be placed into operative position while the other remains in an inoperative or non-interfering position.

In the embodiment shown in the drawings, the skis are carried by a conventional retractable landing gear equipped with wheels and the skis are mounted for movement on such landing gear into a position below the wheels in which the skis are operative or into a position above and to one side of the wheels in which they are inoperative and will not interfere with normal operation of the wheels.

Preferably the skis may be expanded or contracted in length at the will of the operator. Ordinarily, the skis will be expanded in length when they are in position for supporting the aircraft in takeoffs or in landings and will be contracted when in inoperative position either at the time the wheels are in use or when the landing gear is retracted.

The primary advantage of the present invention lies in the fact that an aircraft may take off, for example, on wheels from a dry, hard-surfaced airport while it may be put down by the use of skis in a snow-covered area. Furthermore, the skis of the present invention may be used in the manner of jacks to lift the wheels out of mud in which the aircraft may become mired. The skis also may be used in the manner of jacks for the purpose of changing tires or other service to the wheels which it may be necessary to perform in areas devoid of servicing or maintenance equipment.

The skis may be made expansible and contractible in length as by constructing them of telescoping parts equipped with suitable power actuating means for moving these parts relative to one another. A particular advantage of the telescoping or other expansible or contractible construction is that for efficient operation as skis, they should have considerable length based upon the weight of the aircraft and the type of landing gear, whereas when in inoperative position such length might interfere with the operation of the wheels on the landing gear. Furthermore, in many types of aircraft the finding of space for stowing retracted landing gear presents a problem and the contracted skis will require less stowing space. It will be understood that the skis may be stowed interiorly of the aircraft, as in wing-wells along with the wheels, or that they may be faired into the covers frequently provided for closing the wheel wells. Furthermore, the skis may be stowed up close against the under surface of the wing with part or all of the ski bodies projecting exteriorly of the aircraft. All such details are matters of particular design in the application of this invention to different types of aircraft.

For the purposes of illustration, I have shown an embodiment of my invention in a landing gear of retractable type applied to a fighter aircraft in which the skis, in contracted position, retract snugly against the lower surfaces of the wings while the wheels retract in a conventional manner into the interior of the wings near the roots thereof.

It is the object of the present invention to provide a combined wheel and ski landing gear for aircraft in which the wheels or skis may be used independently of one another and entirely at the option of the operator of the aircraft.

Referring now to the drawings in which a preferred but obviously not necessarily the only form of my invention is illustrated.

Fig. 1 is a side elevational view with parts in section, of a landing gear in landing position and embodying the present invention, the parts being shown in a position in which the ski is operative;

Fig. 4 is a section along the line 4—4 of Fig. 1;

Fig. 5 is a fragmentary view with parts in section, showing details of the structure shown in Fig. 1;

Fig. 6 is a section taken along the lines 6—6 in Fig. 5;

Fig. 7 is a diagrammatic view of the apparatus of the present invention applied to an aircraft, the parts being shown with the skis in operative position;

Fig. 8 is a view, similar to Fig. 7, but in which the skis have been raised to an intermediate position, and the wheels are in operative position;

Fig. 9 is a similar view in which the skis have been turned through 90° into their inoperative position in which the wheels may be used and in which the landing gear is ready to be retracted; and Fig. 10 is a similar view in which the landing gear is retracted for flight.

Figure 3:
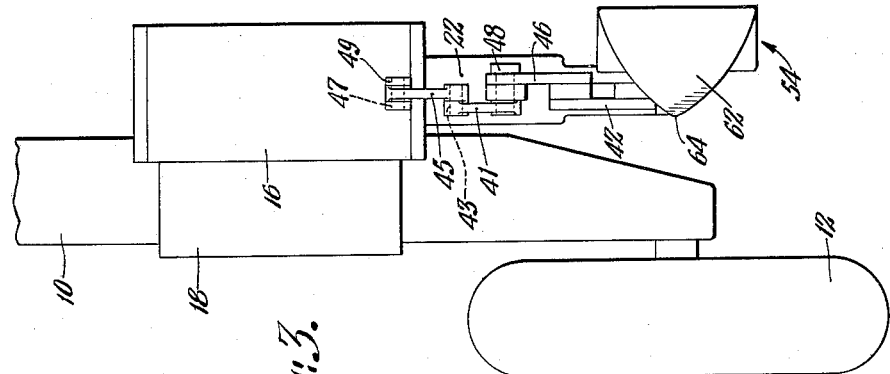
Fig. 3 is a front elevation of the parts as shown in Fig. 2.

Referring now to the drawings, there is shown a leg 10 forming a part of the landing gear of an aircraft. At its lower end the leg 10 carries a conventional landing wheel mounted in the usual manner on an axle 14. The leg 10 and the landing wheel 12 may be of any particular construction and size suitable for the aircraft to which they are attached. For example, they may comprise a part of the main landing gear or they may be nose or tail wheels and they may or may not be retractable, as desired. For purposes of illustration, I have shown the leg 10 as forming a part of a retractable main landing gear for relatively small aircraft, such as fighter aircraft.

For the purposes of the present invention, the leg 10 carries a hydraulic cylinder 16 attached thereto by any suitable form of bracket 18. The hydraulic cylinder 16 is provided with a piston 20 and a piston rod 22 which is held against rotation about its longitudinal axis by well known means. The piston rod 22 is of relatively heavy construction having adequate strength for the support of the aircraft upon the ski landing gear to be described.

At its lower end the piston rod 22 is provided with a transverse bore which receives a headed pivot pin on which is freely pivoted a body 26. The body 26 includes a forwardly extending portion 28, a downwardly extending portion 30 and inclined shoulders 32 and 34 arranged to abut respectively against inclined surfaces 36 and 38 formed on the lower end of the piston rod 22. Abutment of the shoulders and surfaces just described serves to limit the pivotal movement of the body 26 about the pin 24 and relative to the piston rod 22 for a purpose to be described.

The forwardly projecting portion 28 of the body 26 carries a pivot pin 40 on which there is pivoted a link 42 carrying a pivot pin 44 at its free end. A link 46 is pivoted upon the pin 44 and at its other end to a pin 48 secured to a lug 50 fastened to the piston rod 22. The pivot 48 also carries one end of a link 41, pivoted at 43 to a link 45, in turn pivoted at 47 to a lug 49 formed on the cylinder 16. The linkage just described constitutes a double toggle for holding the piston rod 22 and ski 54 against twisting about the axis of the piston rod.

The downwardly extending portion 30 of the body 26 carries an extendible and contractible ski indicated generally at 54 and preferably made up of telescoping sections. A preferred form of connection between the ski 54 and the body 26 will be described in greater detail hereinbelow.

The ski 54 comprises a central section 56 of relatively heavy and rugged construction which is connected as aforesaid to the downwardly extending portion 30 of the body 26. Toward the forward end of the ski the central section 56 has fixed thereto a relatively light weight rectangular tubular section 58 over which another relatively light weight rectangular tubular section 60 may telescope. At its extreme forward end the section 60 is preferably curved upwardly as at 62, as is customary in the construction of skis, and it may come to a point as indicated at 64 (see Figs. 2 and 3).

Toward its rearward end the central section 56 has fixed thereto a relatively light weight rectangular tubular section 66 which telescopically receives a relatively light weight rectangular tubular section 68.

Figure 2:
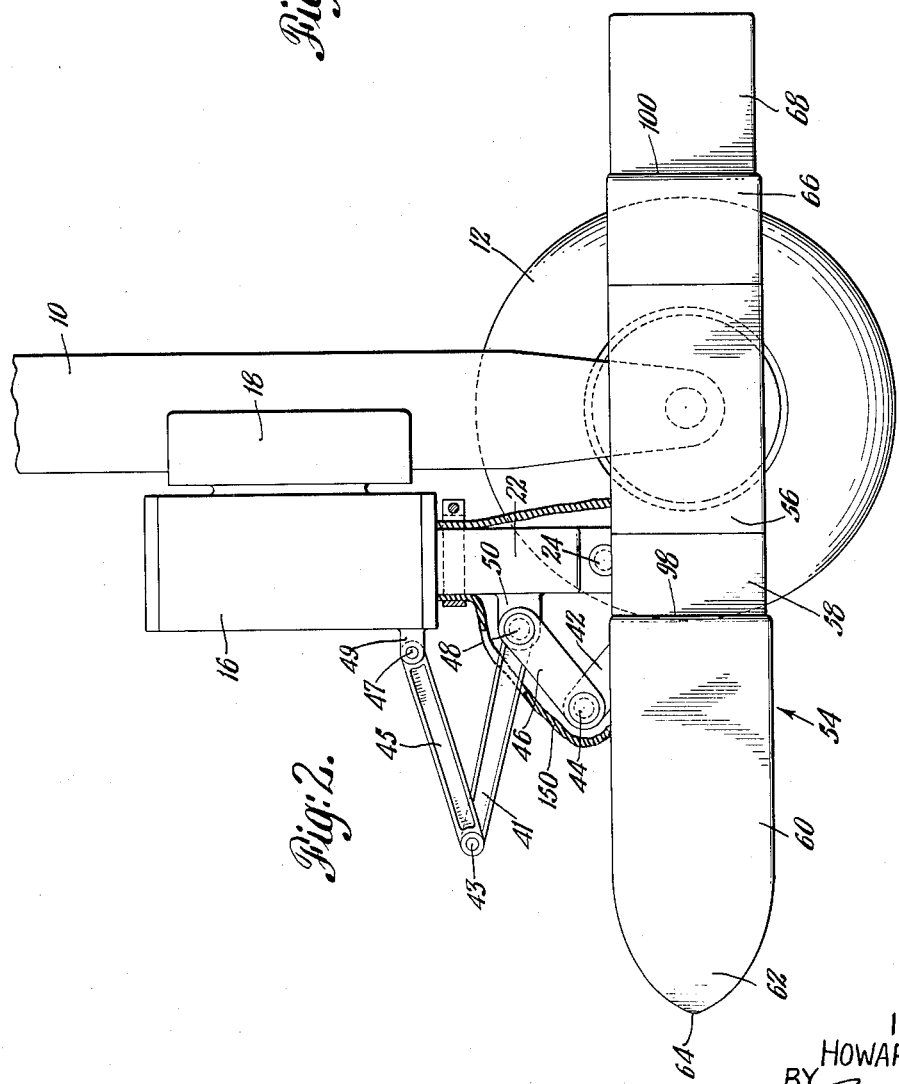
Fig. 2 is a view similar to Fig. 1 but in which the ski has been contracted in length and has been turned through 90° and elevated relative to the wheel, so that the wheel is left in operative position.

As will be apparent from an inspection of Figs. 2 and 4, for example, the rectangular tubular sections just described are relatively much wider than they are high, whereby to impart to the ski the expected wide, flat contour while at the same time providing sufficient space within the body of the ski for mechanism by which the ski may be expanded or contracted in length by relative movement between the telescoping sections.

Mechanism of one suitable type for expansion and contraction in length of the ski 54 has been illustrated in the drawings. As shown therein an interiorly threaded tube 70 is fixed against rotation in the central portion 56 of the ski in a suitable fastening 72. Preferably, although not necessarily, the fastening 72 may permit limited gyratory movement of the shaft 70 so that it may be self-aligning with parts to be described. The internally threaded tube 70 terminates close to the rearward end of the tubular section 66 and it receives a threaded rod 74 which is driven for rotation by a motor 76 carried in a suitable housing 78 at the extreme rearward end of the tubular section 68. The motor 76 may be one of the light weight gear reduction motors familiar to the aircraft industry and capable of delivering very considerable amounts of power at relatively slow rotational speeds. They are provided with self-locking clutch mechanisms and adjustable limit switches which are built in so that the motors will turn a predetermined number of revolutions first in one direction and then in the other. Such motors are commonly referred to as electric actuators and the details of construction thereof form no part of the present invention. In the present instance, the threaded rod 74 is coupled for rotation with the low speed shaft of the motor 76 by means of a coupling 80 which preferably permits some gyratory motion of the rod 74.

It will be apparent that the mechanism just described will be effective, upon energization of the motor 76 in the proper direction of rotation, to thread the rod 74 into the internally threaded tube 70, thus drawing the rear ski section 68 a distance, predetermined by adjustment of limit switches for example, into telescoped position within the tubular section 66. Energization of the motor for rotation in the opposite direction will be effective to move the section 68 outwardly of the section 66 to extend the length of the ski 54. The limited gyratory motion referred to above in connection with the internally threaded tube 70 and the threaded rod 74 permits self-alignment of these parts so that they may run freely without the need for extremely close manufacturing tolerances. The length of the travel imparted to the rear section 68 is, of course, dependent upon the proportioning of the sections 66 and 68 and will vary in accordance with the particular size of ski being constructed and the amount of extension and contraction desired for a particular installation.

A similar mechanism is provided for telescoping the forward section 60 upon the section 58. In this case the section 60 encompasses the section 58 and preferably the parts are so proportioned that the section 60 may also encompass a part of the central section 56 in order to provide maximum contractability.

An internally threaded tube 82 is secured by a suitable fixture 84 to the central portion 56 and it receives a threaded rod 86 which may be rotated by a motor 88 similar to the motor 76 described above. The motor 88 is carried in a suitable housing 90 at the extreme forward end of the ski. The threaded rod 86 and internally threaded tube 82 preferable also are mounted for limited gyratory motion for convenience in alignment of parts as described above in connection with the after section of the ski.

It may be found desirable to provide ventilating louvres 92 in the forward motor housing 90 and similar louvres 94 in the after motor housing 78 for the dissipation of the relatively large amount of heat which may be developed by small high powered electric actuators of the type herein suggested.

It will be apparent that various modifications may be made in the mechanism for contracting and expanding the skis in that the power might be applied centrally rather than by actuators carried in the movable portions of the ski or hydraulic actuators might be substituted for the electric actuators. The essential point in this phase of the present invention is the provision of the relatively movable ski sections and some form of power actuated means for expanding and contracting the length of the skis at the will of the operator of the aircraft whether the plane be in flight or resting upon its wheels.

Obviously the skis are not intended to be extended or contracted in length while they are resting upon the ground. Preferably expansion and contraction takes place when the ski is in or near an inoperative position, it being apparent that such action of the ski may overlap with movements thereof into and out of operative position to effect a saving in time.

In the embodiment chosen for illustration, I have shown an electric heater 96 positioned within the central section 56 of the ski body. This is merely an illustrative positioning of a heater, it being apparent that one or several heaters may be positioned within the various parts of the ski for the purpose of preventing icing in flight and for melting snow which might adhere to the ski after a takeoff. Heating means of this type will be effective to prevent icing which might otherwise obstruct relative motion of the ski sections when it is desired to extend or contract them.

It has been found desirable to provide relatively sharp edges around the end of the larger of two telescoping members for the purpose of scraping ice, snow or mud from the smaller of the telescoping members as it moves inwardly of the larger. Thus in Fig. 1 I have shown such sharp edges at 98 on the section 60 and at 100 on the section 66.

The connection between the ski 54 and the downwardly extending portion 30 of the body 26 has not yet been described. Such connection may be rigid so that the skis may move vertically relative to the wheels with the ground contacting surfaces thereof remaining generally parallel with the ground. However, in the illustrative embodiment shown in the drawings, the skis are arranged to pivot through 90° along an axis parallel with the longitudinal axis of the skis into a position wherein the larger cross-sectional dimension of each of the skis will lie generally parallel with the plane of the adjacent landing wheel. This is particularly desirable when retractable landing gear of the general type illustrated herein is used because in such landing gear the wheels swing upwardly through about 90° in a direction transverse of the aircraft when they are retracted and the skis may be stowed up close to the undersurface of the wing as shown, for example, in Fig. 10. With other types of retractable landing gear a different amount of ski rotation may be desired and in those types wherein the wheels swing in a direction longitudinal of the aircraft, as in nose wheels for example, no such ski-rotation may be necessary.

Referring particularly to Figs. 1, 4, 5 and 6, I will now describe a preferred form of mechanism for rotating ski 54 about an axis parallel to its longitudinal axis when such is desired. The downwardly extending portion 30 of the body 26 is provided with a splined opening to receive the splined central portion 103 of a bolt 102 (see Fig. 5). The bolt 102 has a cylindrical portion 104 which is of the same diameter as the maximum diameter of the splined section 103 and a head 105 is formed at the end of the cylindrical section 104. The bolt 102 also has a cylindrical section 106 which is no greater in diameter than the minimum diameter of the splined section 103. The cylindrical sections 104 and 106 serve respectively as bearings about which lugs 108 and 110, formed on the ski body, may pivot. The distance between the head 105 and the shoulder 112 between the section 103 and the section 106, is such that the lug 108 may turn freely upon the section 104 when the shoulder 112 abuts against the surface of the lug 110.

An internally toothed gear 114 is secured to the right hand end of the bolt 102 by means of a nut 116 which is threaded upon a portion 118 having a diameter less than that of the portion 106. When the nut 116 is tightened, the internal gear 114 is brought to bear against a shoulder 120 between the portions 106 and 118. The portion 106 is of such length between the shoulders 112 and 120 that the lug 110 may turn freely upon the portion 106 and relative to the internal gear 114 which is fitted into a recess in the lug 110. Preferably also the gear 114 is keyed or splined to the reduced portion 118 in order to insure against rotation of the gear relative to the bolt 102.

As stated above, the lugs 108 and 110 are secured to the ski 54 and preferably are integral with the central section 56 thereof as will be apparent from an inspection of Figs. 1 and 5. The central section 56 also has mounted thereon a motor 122 of the electric actuator type described above, having a slow speed shaft 124 to which is fixed a pinion 126 meshing with the teeth of the internal gear 114. When the motor 122 is energized, the pinion 126 will move along the fixed teeth of internal gear 114 whereby to rotate the entire ski body 54 about the centre of the bolt 102.

Referring now particularly to Figs. 4 and 6, the ski 54 is movable from a position in which the ground engaging face thereof is horizontally disposed, into a position (shown in broken lines in Fig. 4) in which the ground engaging surface is approximately vertical. The latter position of the ski body is shown in full lines in Figs. 2 and 3. While the electric actuator 122 may be provided with the usual self-locking clutch mechanism (not shown) which will serve to hold the ski in either of the positions aforesaid, it is preferred to provide a rugged locking mechanism for holding the ski in its ground engaging position. Thus in Figs. 1 and 4 I have shown a magnetic lock 128 in which windings (not shown) may be energized at will to move an armature 130 to the right or left as viewed in Fig. 1. In Fig. 4, it will be observed that the armature 130 is rectangular in cross-section and is adapted to be projected into and out of locking engagement with a rectangular aperture formed in an angularly disposed extension 132 of the body 26. In Figs. 1 and 4 the armature 130 is shown engaged with the extension 132 for the purpose of locking the ski 54 in its operative position.

Upon energization of the magnetic lock 128 with the polarity properly selected, the armature 130 will be moved inwardly of the lock 128 and withdrawn from the extension 132. The ski 54 is then free to be turned in response to actuation of the motor 122.

The extension 132 to which the ski 54 may be locked as aforesaid may also be provided with stop surfaces 134 and 136 against which inner surface portions of the section 56 may abut respectively to stop the ski in its operative and in its inoperative position as will be apparent from an inspection of Fig. 4.

I have not shown hydraulic lines, electrical wiring, or the valves and switches located in the cockpit for controlling the hydraulic cylinders 16, the electric actuators 76, 88 and 122 or the magnetic lock 128. It is believed to be apparent to one skilled in the art that such may be laid out in any suitable manner and arranged for interlocking or sequential operation as desired for any type of aircraft to which this invention may be applied.

In Figs. 7 through 10, an embodiment of the present invention is shown applied to a relatively small aircraft 142 of the fighter type. In such an aircraft the legs 10 are pivoted in known manner at 138 between the spars (not shown) of the wings 140. At their upper ends the legs 10 are provided with angularly offset arms 143 to each of which is pivoted a piston rod 144 of a hydraulic cylinder 146. The cylinders 146 are each pivoted at 148 to a fixed portion of the respective wings 140. When the cylinders 146 are actuated in such direction as to project the piston rods 144, they will be effective through the arms 143 to swing the legs 10 and the landing gear carried thereby upwardly and inwardly as indicated in Fig. 10 into a retracted position for flight. The retracting mechanism just described is conventional and, of course, is subject to variation in design depending upon the type and size of aircraft involved.

In Fig. 7, the landing gear of the present invention is shown in a position in which the skis 54 are in operative position to support the aircraft upon the ground. The position thus corresponds with that of the single ski illustrated in Fig. 1 and Fig. 4. In this position the electric lock 128 of each ski will have projected the armature 130 into locking engagement with the extension 132 and the skis will be effectively held against rotation about their longitudinal axes.

In the description above, reference has been made to the abutting stop surfaces 32, 34, 36 and 38, shown in Fig. 1, which serve to limit swinging of the skis about the transverse axes established by the pivot pins 24. It will be appreciated that the extent of permissible swinging movement will be dependent upon the type of aircraft to which the skis may be applied. For example, if the aircraft is of the type having a tail skid or tail wheel it will be necessary for the skis to turn in counterclockwise direction, as viewed in Fig. 1, through an angle sufficient to permit such tail skid or wheel to rest upon the ground when the aircraft is moving at a slow speed or is stationary. The stop surfaces 34 and 38 must therefore be spaced as to permit such angular movement.

The surfaces 32 and 36 should be so disposed that the skis may rotate in a clockwise direction, as viewed in Fig. 1, to assume a proper approach position when a landing is being made. Preferably the skis are provided with a weight 149 at their rearward ends so that when extended in length the rear portions of the skis will swing downwardly to bring the stop surfaces 32 and 36 into engagement with the forward portions of the skis sloping upwardly. Thus when initial contact is made with the ground, the rear end of the skis will strike first as is customary with aircraft skis. The stop surfaces just described as well as the links 42, 46 and the internal gear 114 and pinion 126 may advantageously be enclosed within a suitably shaped boot 150 made of rubber or other flexible material for the protection of these parts against the elements.

The operation of the illustrated embodiment of my invention will now be described:

It will be assumed that the aircraft will take off on skis starting from the position shown in Fig. 7. After it leaves the ground the skis 54 may be drawn upwardly by admitting hydraulic fluid to the underside of the piston 20. As the skis reach or approach the position illustrated in Fig. 8, the electric lock 128 is energized to remove the armature 130 from the body extension 132 and the skis may be turned toward the position shown in Fig. 9 by energizing the electric actuator 122 for rotation in the appropriate direction. During this same period of time the skis 54 may be contracted in length by energizing electric actuators 76 and 88 for rotation in the appropriate direction. Such contraction may occur simultaneously with the upward motion or rotative motion although it is desirable that the contracting movement not start until afer the skis have moved upwardly beyond the ground engaging portions of wheels 12. Alternately the skis may be moved upwardly from the Fig. 7 position to the Fig. 8 position and rotated into the Fig. 9 position before the contracting movement starts. In any event, when both the rotative and contractive movements have been completed the skis will occupy the position shown in Fig. 9 and in Figs. 2 and 3.

After reaching such position, the landing gear may be retracted by energization of the hydraulic retracting cylinders 146 to swing the legs 10 upwardly and inwardly of the aircraft. As shown in Fig. 10, the landing wheels 12 and the legs 10 may enter into suitable wells within the wings and the skis 54 may be brought up closely against the under-surface of the wings where they may substantially merge with such fairing as may be provided for closing the wing well openings. For the purposes of illustration of the present invention, such fairing has been omitted. In the particular aircraft chosen for illustration, it has been found expedient to contract the forward portions of the skis only to such an extent that the pointed tips 62 and 64 of the skis 54 will be fair into the leading edge of the wings as shown in Fig. 10. In other types of aircraft it will be entirely practical to provide wing wells to receive the skis 54 along with the wheels 12 and thus leave no protuberances on the lower wing surfaces.

When it is desired to land the aircraft, the operator may land upon skis 54 or upon wheels 12 as conditions dictate. If he wishes to land on wheels he operates the hydraulic cylinders 146 to swing the landing gear into the position illustrated in Fig. 9. The skis remain contracted and above the ground engaging portions of the wheels 12, as clearly shown in Fig. 2. The contracted length of the skis is such that neither the forward nor rearward ends thereof are at all likely to strike the ground or to become entangled with vegetation or other obstacles likely to be encountered. This is a particular advantage offered by the extensible and contractible skis of the present invention.

If on the other hand the operator of the aircraft desires to land upon skis 54, the landing gear will be lowered from the position in Fig. 10 to that of Fig. 9 and thereafter the skis will be rotated into the position of Fig. 8 and locked in that position by the electric lock 128. In the meantime, or thereafter as desired, the skis may be expanded in length and lowered into the position illustrated in Fig. 7 wherein the aircraft is in condition to land upon the skis 54.

Other advantages in use of the landing gear of the present invention will be apparent. For example, if the aircraft is resting upon wheels 12 in the position shown in Fig. 9 and it is desired to take off on skis, or to raise the wheels 12 to unmire them or for the purpose of changing tires or the like, it is merely necessary to rotate, expand and lower the skis into contact with the ground and thereafter continue actuation of the cylinders 16 to jack the aircraft into the position shown in Fig. 7.

Obviously the various movements of the skis and of the retractable landing gear may be timed for simultaneous operation on the port and starboard sides of the aircraft or, if preferred, the operations may be staggered in whole or in part, depending upon the capacity of the hydraulic and electrical systems of the aircraft.

I claim:

1. A landing ski for aircraft comprising an elongated hollow tubular body, said tubular body comprising a plurality of telescopically arranged sections, one of said sections being adapted to be secured to a part of an aircraft landing gear and another of said sections being movable in telescoping relationship with said first named section to extend or contract the overall length of said hollow ski body, and means for moving said second named section relative to said first named section, said last named means including interengaging relatively rotatable screw threaded members connected respectively to said first named and second named sections, and power actuated means carried by one of said sections for causing relative rotation of said screw threaded members.

2. A landing and supporting device for aircraft comprising an elongated hollow body made up of a plurality of telescopically arranged sections having contiguous surfaces to form a substantially unbroken landing and supporting surface, one of said sections being adapted to be secured to a part of an aircraft landing gear and another of said sections being movable in telescoping relationship with said first named section to extend or contract the length of said landing and supporting surface, and means for moving said another section relative to said first named section, said last named means including interengaging relatively rotatable screw threaded members connected respectively to said first named and second named sections, and power activated means carried by one of said sections for causing relative rotation of said screw threaded members.

3. In an aircraft having a retractable landing gear including a movable leg and a landing wheel thereon, the combination of a landing ski comprising a plurality of relatively movable sections together presenting a substantially unbroken relatively long and narrow ground engaging surface, means connected between said movable sections for causing relative movement between said sections to extend or contract the length of said ground engaging surface, and means for mounting said ski upon said leg for movement with said wheel into and out of retracted position.

4. In an aircraft having a retractable landing gear including a movable leg and a landing wheel thereon, the combination of a landing ski comprising a plurality of relatively movable sections together presenting a substantially unbroken relatively long and narrow ground engaging surface, means connected between said movable sections for causing relative movement between said sections to extend or contract the length of said ground engaging surface, and means for mounting said ski upon said leg for movement with said wheel into and out of retracted position, said mounting means including means for moving said landing ski relative to said landing wheel between respectively operative and inoperative positions at the option of the operator of the aircraft when the aircraft is in flight or is resting upon the ground on either said landing wheel or said landing ski.

5. In an aircraft having a retractable landing gear including a movable leg and a landing wheel thereon, the combination of an auxiliary landing and supporting device comprising a plurality of relatively movable sections together presenting a substantially unbroken landing and supporting surface, means connected between said movable sections for causing relative movement between said sections to extend or contract the length of said landing and supporting surface, and means for mounting said auxiliary landing device upon said leg for movement with said wheel into and out of retracted position.

6. In an aircraft having a retractable landing gear including a movable leg, the combination of a landing and supporting device comprising an elongated hollow body made up of a plurality of telescopically arranged generally tubular sections having surfaces which together form a substantially unbroken landing and supporting surface, means connected between said movable sections for causing relative movement between said sections to extend or contract the length of said landing and supporting surface, and means for mounting said landing and supporting device upon said leg for movement therewith into and out of operative and retractive positions.

7. In an aircraft landing gear the combination of a leg with a landing wheel thereon, the lower peripheral surface of said wheel constituting a ground engaging surface adapted to support said aircraft; a landing ski comprising a plurality of relatively movable sections having contiguous surfaces forming a substantially unbroken relatively long and narrow ground engaging surface adapted to support said aircraft; means for mounting said ski upon said leg, said mounting means including means for moving said ski in a direction substantially normal to the ground engaging surface of said ski and between a first position in which the ground engaging surface of said ski lies above and laterally offset to one side of the ground engaging surface of said wheel leaving said wheel free to support said aircraft and a second position in which the ground engaging surface of said ski is laterally offset to one side of and below the ground engaging surface of said wheel wherein said ski is adapted to support said aircraft; and means connected between said relatively movable sections of said ski for causing relative movement between said sections to extend the length of said ski and the ground engaging surface thereof to a length suitable for use in landings and take-offs and to contract the length of said ski during periods of non-use of said ski.

8. In an aircraft landing gear the combination of a leg with a landing wheel thereon, the lower peripheral surface of said wheel constituting a ground engaging surface adapted to support said aircraft; a landing ski comprising a plurality of relatively movable sections having contiguous surfaces forming a substantially unbroken relatively long and narrow ground engaging surface adapted to support said aircraft; means for mounting said ski upon said leg, said mounting means including means for moving said ski in a direction substantially normal to the ground engaging surface of said ski and between a first position in which the ground engaging surface of said ski lies above and laterally offset to one side of the ground engaging surface of said wheel leaving said wheel free to support said aircraft and a second position in which the ground engaging surface of said ski is laterally offset to one side of and below the ground engaging surface of said wheel wherein said ski is adapted to support said aircraft, said mounting means also including pivoting means having an axis substantially parallel with the longitudinal axis of said ski; means connected between said relatively movable sections of said ski for causing relative movement between said sections to extend the length of said ski and the ground engaging surface thereof to a length suitable for use in landings and take-offs and to contract the length of said ski during periods of non-use of said ski; and means for rotating said ski about the axis of said pivoting means.

References Cited in the file of this patent

UNITED STATES PATENTS

| | | |
|---|---|---|
| 967,742 | Eckart | Aug. 16, 1910 |
| 1,073,294 | Siewert | Sept. 16, 1913 |
| 1,106,020 | Wilds | Aug. 4, 1914 |
| 1,583,693 | Krafft | May 4, 1926 |
| 1,757,687 | Silva | May 6, 1930 |
| 1,795,413 | Stiles | Mar. 10, 1931 |
| 1,811,152 | Procofieff | June 23, 1931 |
| 1,844,295 | Perry | Feb. 9, 1932 |
| 1,888,335 | Towle | Nov. 22, 1932 |
| 1,910,423 | Bolas | May 23, 1933 |
| 1,929,630 | Duell | Oct. 10, 1933 |
| 1,930,922 | Burnelli | Oct. 17, 1933 |
| 2,023,312 | DeServersky | Dec. 3, 1935 |
| 2,106,934 | Saulnier | Feb. 1, 1938 |
| 2,164,805 | Ecton | July 4, 1939 |
| 2,186,060 | Batey | Jan. 9, 1940 |
| 2,196,946 | Stone | Apr. 9, 1940 |
| 2,215,598 | Sznycer | Sept. 24, 1940 |
| 2,285,330 | Dowden | June 2, 1942 |
| 2,361,293 | Jeffries | Oct. 24, 1944 |
| 2,532,610 | Ditter | Dec. 5, 1950 |
| 2,532,611 | Ditter | Dec. 5, 1950 |
| 2,533,951 | Patriarche | Dec. 12, 1950 |

FOREIGN PATENTS

| | | |
|---|---|---|
| 71,226 | Switzerland | Oct. 29, 1929 |
| 223,618 | Great Britain | Oct. 24, 1924 |
| 22,523 | France | Jan. 28, 1921 |
| | (1st addition to No. 508,029) | |